United States Patent
Habele

(10) Patent No.: US 7,138,737 B2
(45) Date of Patent: Nov. 21, 2006

(54) BRAKE DEVICE FOR AN ELECTRIC MOTOR

(75) Inventor: Michael Habele, Waldenbuch (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/511,949

(22) PCT Filed: Dec. 10, 2003

(86) PCT No.: PCT/DE03/04072

§ 371 (c)(1),
(2), (4) Date: Oct. 21, 2004

(87) PCT Pub. No.: WO2004/088821

PCT Pub. Date: Oct. 14, 2004

(65) Prior Publication Data

US 2005/0179330 A1    Aug. 18, 2005

(30) Foreign Application Priority Data

Apr. 1, 2003    (DE) .............................. 103 14 886

(51) Int. Cl.
*H02K 7/102* (2006.01)
*H02K 7/14* (2006.01)
*H02K 37/00* (2006.01)

(52) U.S. Cl. ........................................ 310/77; 310/93

(58) Field of Classification Search .................. 310/77, 310/76, 92, 93, 94

See application file for complete search history.

(56) References Cited

U.S. PATENT DOCUMENTS

| 4,022,301 A | * | 5/1977 | Hansen ........................ 310/77 |
| 4,059,779 A | * | 11/1977 | Wistinghausen ............. 310/77 |
| 5,444,317 A | * | 8/1995 | Anderson et al. ............. 310/77 |
| 6,265,804 B1 | * | 7/2001 | Nitta et al. ................... 310/259 |
| 6,326,710 B1 | * | 12/2001 | Guenther et al. ............. 310/77 |
| 6,731,034 B1 | | 5/2004 | Habele et al. ............... 310/254 |
| 2003/0077476 A1 | * | 4/2003 | Reutlinger ................... 428/615 |
| 2003/0132682 A1 | | 7/2003 | Herzog ........................ 310/77 |

FOREIGN PATENT DOCUMENTS

| DE | 1 538 902 | | 2/1970 |
| DE | 2 263 475 | | 7/1974 |
| DE | 198 60 396 A1 | | 6/2000 |
| FR | 1 098 914 | | 8/1955 |
| GB | 1 451 165 | | 9/1976 |
| WO | WO 00/39912 A1 | * | 6/2000 |
| WO | WO 00/33808 A1 | * | 4/2002 |

* cited by examiner

Primary Examiner—Darren Schuberg
Assistant Examiner—Erik Preston
(74) Attorney, Agent, or Firm—Michael J. Striker

(57) ABSTRACT

A braking device for an electric motor includes a rotor (10) and a stator, in particular for a direct current series wound motor and a brake element (20) which is movable between a braking position and an operating position; a brake shoe (30) that brakes the rotor (10) in the braking position is mounted on the brake element (20). The brake shoe (30) is mounted on the brake element (20) on the trailing end relative to the direction of rotation of the rotor (10).

10 Claims, 4 Drawing Sheets

BRAKE DEVICE FOR AN ELECTRIC MOTOR

CROSS-REFERENCE

The invention described and claimed hereinbelow is also described in DE 103 14 886.8, filed Apr. 1, 2003. This German Patent Application, whose subject matter is incorporated here by reference, provides the basis for a claim of priority of invention under 35 U.S.C. 119(a)–(d).

BACKGROUND OF THE INVENTION

The invention is based on a braking device for an electric motor.

From German Patent Disclosure DE 198 60 396 A1, a braking device for a direct current series wound motor is known that makes it possible to brake the rotor of the direct current series wound motor upon shutoff. To that end, the known braking device has a rockerlike brake element with a brake arm and a disengagement arm; the rockerlike brake element is pivotable between a braking position and an operating position. A brake shoe is secured to the brake arm, and the brake arm with the brake shoe is prestressed in the direction of the rotor by a compression spring and brakes the rotor in the braking position.

The disengagement arm of the rockerlike brake element, conversely, has the task of lifting the brake arm and the brake shoe from the rotor in operation so that the rotor can rotate freely. To that end, the disengagement arm and a yoke part of the stator form an air gap, so that when current is supplied to the stator winding, the disengagement arm is pulled against the yoke part, lifting the brake shoe from the rotor.

In the known braking device, the brake arm with the brake shoe is disposed on the rockerlike brake element on the leading end relative to the direction of rotation of the rotor, while the disengagement arm is conversely disposed on the brake element on the trailing end. This arrangement of the brake shoe on the leading end offers the advantage that the braking force acting on the brake shoe exerts a torque on the brake element, as a result of which the contact pressure generated by the spring is reinforced.

SUMMARY OF THE INVENTION

By comparison, the invention contemplates a braking device in which the brake shoe is disposed on the brake element on the trailing end relative to the direction of rotation of the rotor.

The invention proceeds from the recognition that the magnetic flux density in the yoke of the stator is greater on the leading end than on the trailing end, so that the disposition of the brake shoe on the leading end as described above leads to a greater reduction in power than the disposition of the brake shoe on the trailing end in accordance with the invention.

The term "brake shoe" as used within the scope of the invention should be understood in a general sense and includes not only separate brake shoes that are secured to the brake element but also brake shoes formed integrally onto the brake element.

In a preferred exemplary embodiment of the invention, the brake element has a brake arm on the trailing end and a disengagement arm on the leading end, and the brake shoe is mounted on the brake arm on the trailing end.

Preferably, the stator of the electric motor has a yoke part on the leading end, of a magnetically conductive material, and a stator winding; the brake element is preferably also magnetically conductive and, together with the yoke of the stator on the leading end, it forms a motor air gap from the rotor of the electric motor, which in the braking position has an essentially constant gap width on the leading end. Thus the brake element serves to guide the magnetic flux generated by the stator winding and is adapted to the motor air gap, so that the magnetic flux through the brake element is virtually unhindered. Thus in the braking position of the brake element, the yoke part of the stator disposed on the leading end merges as much as possible without graduations and in a flowing fashion with the disengagement arm of the brake element.

Between the yoke part of the stator on the leading end and the disengagement arm of the brake element, there is preferably an air gap, and a constriction that forms a magnetic resistor in the yoke part on the leading end is located in the yoke part on the leading end between the stator winding and the air gap for the disengagement arm of the brake element. Upon starting of the electric motor, the material in this constriction, also called a "bottleneck", enters into saturation, so that the rockerlike brake element is tightened with maximum force; as a result, the brake lining is lifted from the rotor, so that the rotor can rotate freely.

In a preferred exemplary embodiment of the invention, the brake element comprises a plurality of lamination packets, which each comprise a plurality of electrical laminations and are disposed side by side. This laminated form of the brake element, compared to a solid version of the brake element, reduces eddy current losses in the brake element. Moreover, dividing the brake element up into a plurality of lamination packets enables very dimensionally accurate production of the brake element, even if production tolerances are relatively great. A commercially available electrical lamination has a tolerance of 4% of the lamination thickness, for instance. For a lamination packet with a rated thickness of 60 mm, for instance, this means a maximum dimensional deviation of 2.4 mm. To compensate for this dimensional deviation, the number of electrical laminations in the individual lamination packets is varied. If one lamination packet is oversized, for instance, then the adjacent lamination packet can be made undersized, by including one less electrical lamination in this lamination packet.

Preferably, the brake element is pivotably supported by a bearing pin, and the bearing pin is supported in a fixed bearing point by a positive-engagement connection secure against relative rotation.

Upon a pivoting motion of the brake element, accordingly only a relative motion between the brake element and the bearing pin occurs, while conversely the bearing pin is fixed relative to its bearing point. This is advantageous since the area of contact between the bearing pin and the bearing point is substantially smaller than the area of contact between the bearing pin and the brake element, and therefore would wear more quickly upon a relative motion. Thus the fixation of the bearing pin relative to its bearing point improves the mechanical durability of the bearing and hence lengthens the service life of the braking device.

The connection of the bearing pin to the bearing point by positive engagement in a manner secure against relative rotation can be made for instance by flattening the bearing pin on its face ends, to prevent torsion.

Moreover, in a variant of the invention, it is provided that the braking force normally generated by a spring is additionally reinforced by or replaced with a suitable design of the braking device. To that end, in the braking position, the brake element rests on the trailing end on a fixed stop face, and the stop face has a predetermined angle of inclination relative to the radial direction of the rotor, so as to attain a self-clamping of the brake element. The braking force acting on the brake shoe and oriented at a tangent to the jacket face of the rotor causes the brake element to be pulled along the stop face in the direction of the rotor, and as a result the brake shoe is pressed more strongly against the rotor.

The angle of inclination of the stop face relative to the radial direction is preferably in the range between 20\ and 70\, but arbitrary values between these are also possible. Moreover, the brake element is preferably prestressed by a compression spring in the direction of the braking position, in order to press the brake shoe against the rotor; a guide spur for the compression spring that protrudes into the compression spring is disposed on the brake element.

The invention is not limited, however, to the braking device described above but instead also includes an electric motor with a braking device of this kind.

The invention furthermore relates to a machine tool with an electric motor of this kind, and examples that can be named are power drills, power circular saws, and power grinders.

BRIEF DESCRIPTION OF THE DRAWINGS

Further advantages will become apparent from the ensuing description of the drawings. In the drawings, exemplary embodiments of the invention are shown. The drawings, specification, and claims include numerous characteristics in combination. One skilled in the art will expediently consider the characteristics individually as well and put them together to make useful further combinations.

Shown are.

DETAIL DESCRIPTION OF THE PREFERRED EMBODIMENTS

Figure 1:
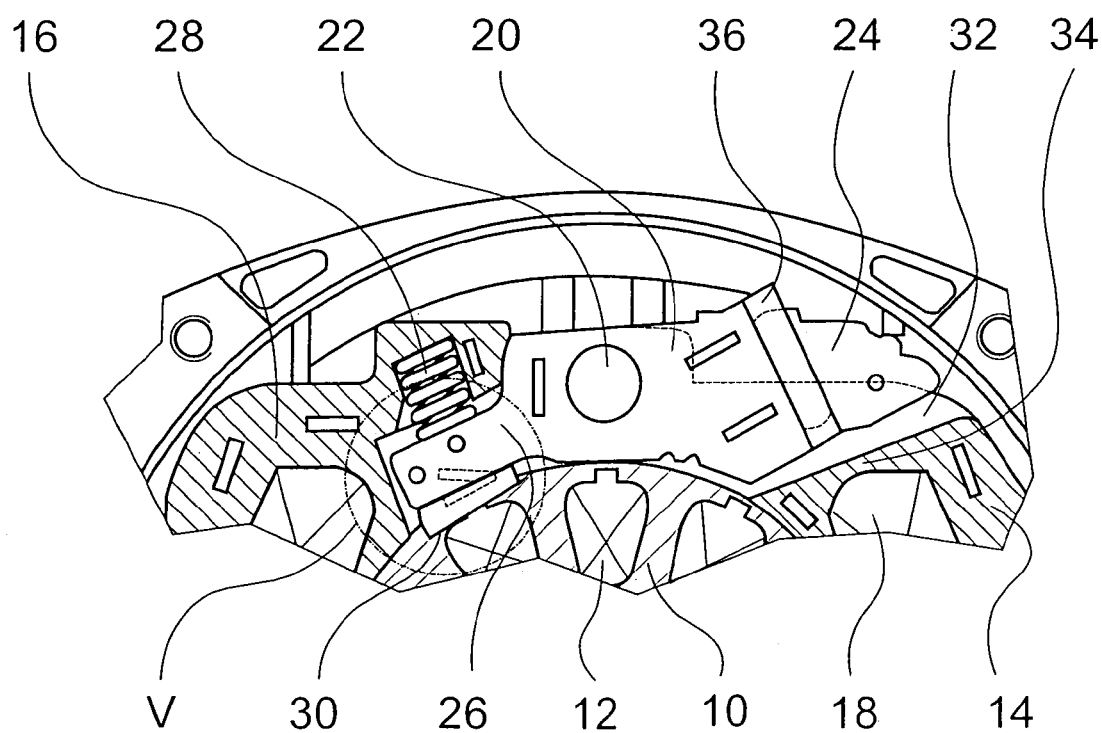
FIG. 1, a cross-sectional view of part of a direct current series wound motor, with a braking device of the invention.

The cross-sectional view in FIG. 1 shows a rotor 10 of an electric motor; the rotor 10 is rotatable counterclockwise, about an axis of rotation extending perpendicular to the drawing, and has a plurality of rotor windings 12.

The drawing also shows both a yoke part 14 on the leading end and a yoke part 16 on the trailing end that are part of a stator of the electric motor; both yoke parts 14, 16 comprise a magnetically conductive material and guide the magnetic flux that is generated by a stator winding 18.

A rockerlike brake element 20 is also shown, which is pivotably supported about the bearing pin 22; the rockerlike brake element 20 has both a disengagement arm 24 disposed on the leading end and a brake arm 26 disposed on the trailing end.

The brake arm 26 of the rockerlike brake element 20 is prestressed in the direction of the rotor 10 by a compression spring 28, and the compression spring 28 is braced in a suitable pocket in the yoke part 16. A brake lining is mounted on the side of the brake arm 26 toward the rotor 10; in the braking position shown in FIG. 1, this brake lining rests on the jacket face of the rotor 10 and as a result brakes it.

The disengagement arm 24 of the rockerlike brake element 20 conversely has the task of lifting the brake arm 26 along with a brake shoe 30 from the rotor 10 so that the rotor can rotate freely. To that end, there is an air gap 32 between the disengagement arm 24 and the yoke part 14 of the stator on the leading end, so that the disengagement arm 24 is attracted onto the yoke part 14 when current is supplied to the stator winding 18, whereupon the rockerlike brake element 20 rotates clockwise, and the brake shoe 30 is lifted from the rotor 10.

In the yoke part 14 on the leading end, there is a constriction 34 between the stator winding 18 and the air gap 32; it forms a magnetic resistor and enters into saturation upon starting of the electric motor, so that the disengagement arm 24 of the rockerlike brake element 20 is tightened with maximum force upon starting of the electric motor.

Moreover, the disengagement arm 24 of the rockerlike brake element 20 is surrounded by a short-circuit ring 36, which in the operating position of the brake element 20 suppresses mechanical vibration.

It should also be noted that the brake element 20, on its leading end in the operating position, conforms on the inside to the contour of the rotor 10, so that between the yoke part 14 on the leading end and the brake element 20 on one side and the rotor 10 on the other, there is a constant motor air gap. In the operating position, the brake element 20 therefore hardly impedes the greater magnetic flux from the yoke part 14 on the leading end via the disengagement arm 24 into the rotor 10, so that the power of the electric motor is reduced hardly at all by the braking device.

Figure 2:
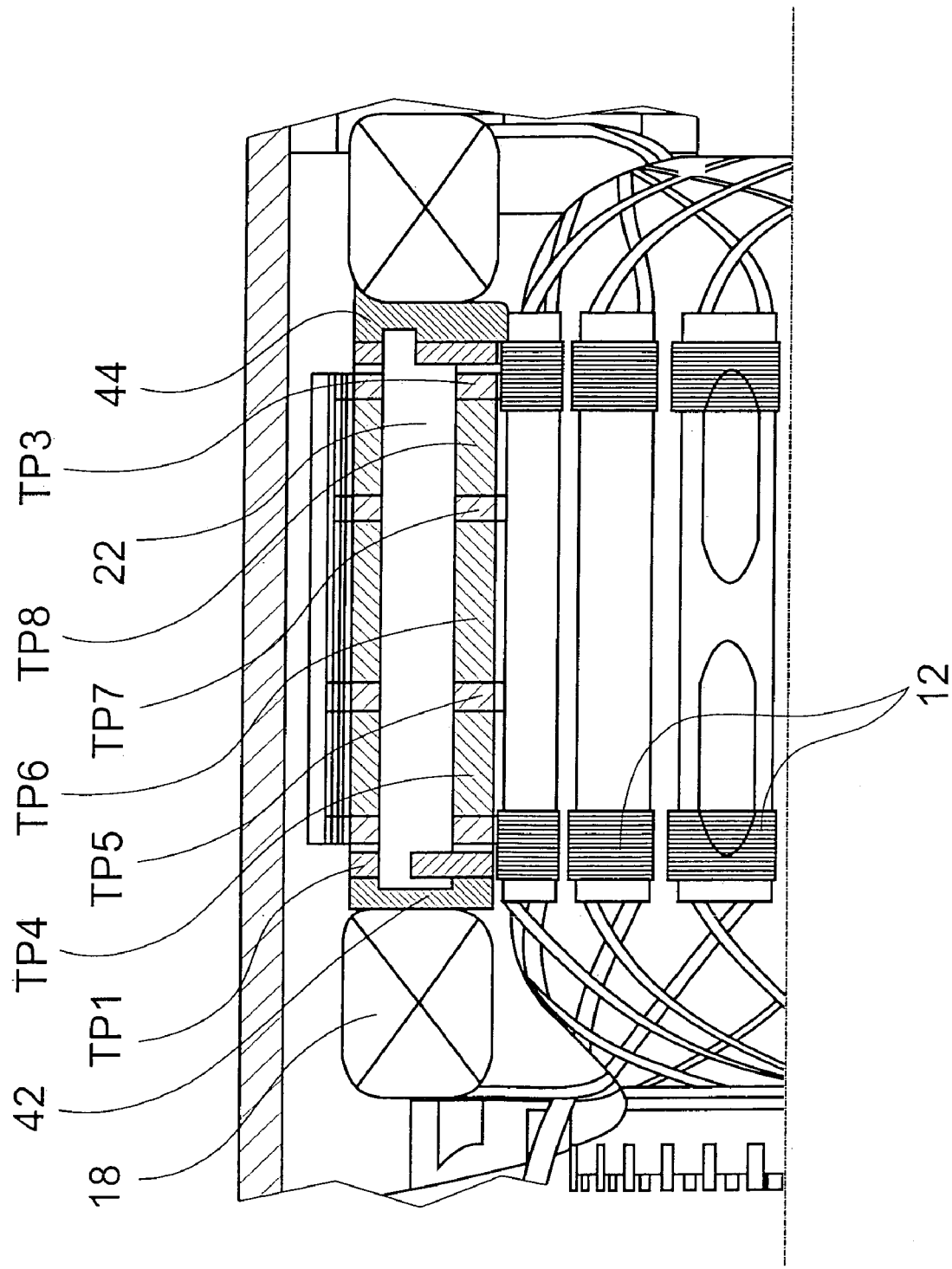
FIG. 2, a longitudinal section of the direct current series wound motor of FIG. 1.
Figure 3:
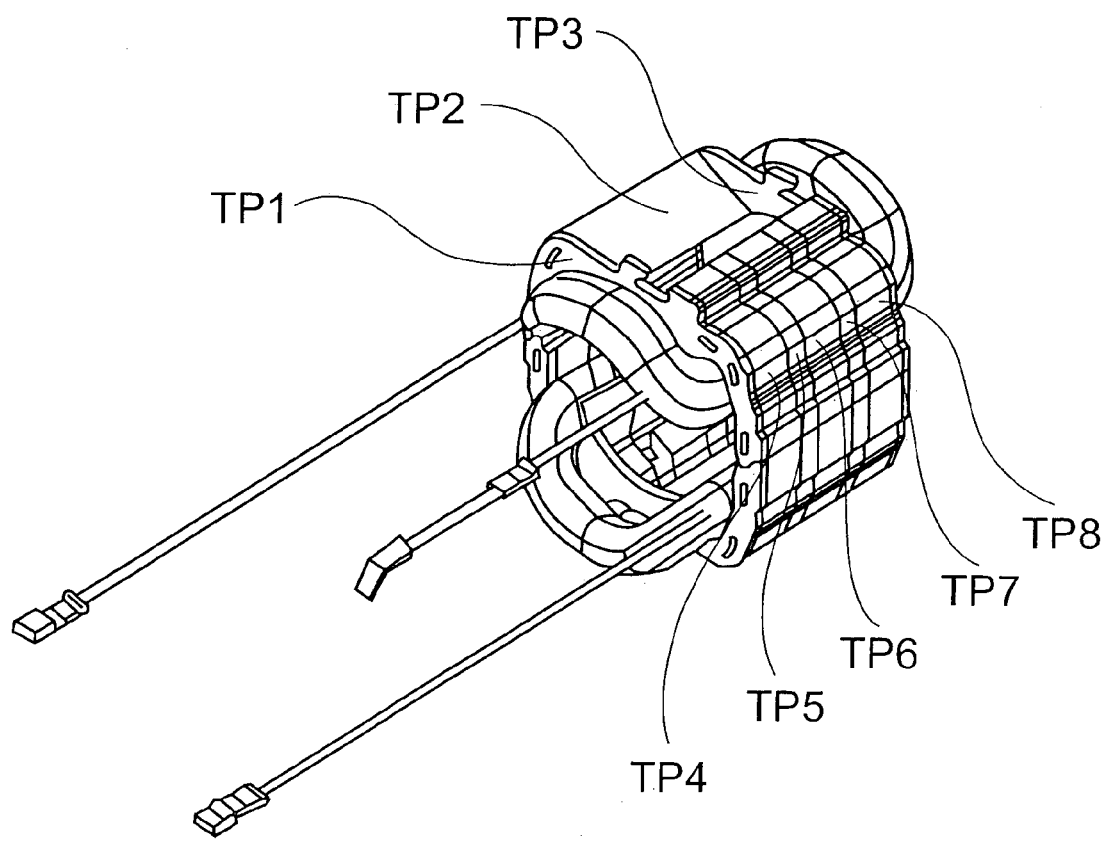
FIG. 3, a perspective view of a stator of the direct current series wound motor of FIGS. 1 and 2.
Figure 4:
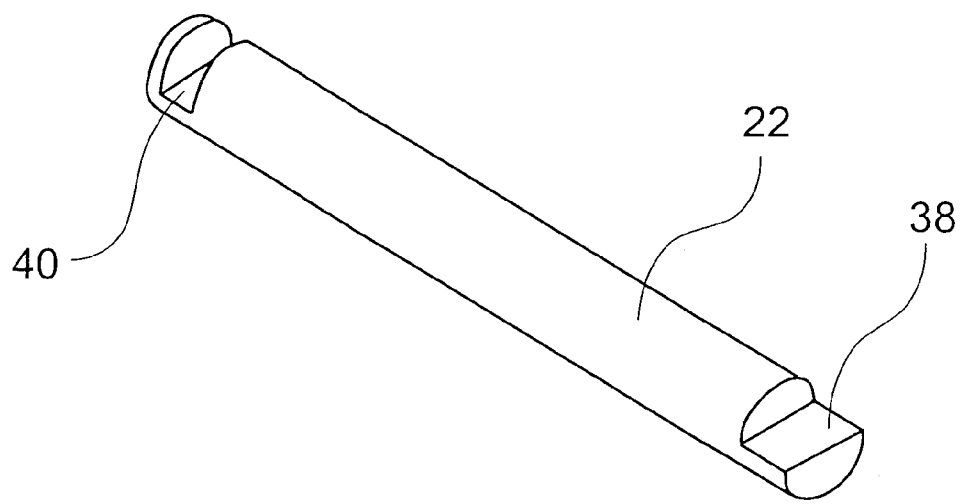
FIG. 4, a perspective view of a bearing pin of the braking device of FIG. 1.

It can also be seen from FIGS. 2 and 3 that the yoke part 16 of the stator on the trailing end is composed of a plurality of lamination packets of different cross sections, TP4–TP8, while the yoke part 14 on the leading end comprises a single lamination packet, TP2. Moreover, laterally there is one further lamination packet each, TP1 and TP3, and all the lamination packets TP1–TP8 comprise electrical laminations with a lamination thickness of 0.5 mm each. Dividing up the yoke part 16 on the trailing end into a plurality of lamination packets TP4–TP8 offers the advantage that at relatively little effort or expense, length tolerances can be adhered to.

The bearing pin 22 shown in FIG. 2 passes through the brake element 20 and is suspended laterally from suitable bearing points in the lamination packets TP1 and TP3. The connection of the bearing pin 22 to the bearing points is effected by positive engagement and in a manner secure against relative rotation, so that the bearing pin 22 cannot rotate relative to the bearing points in the lamination packets TP1 and TP3. This is advantageous, since the contact area at these bearing points is relatively small, which would lead to relatively great mechanical wear upon a relative motion. To this end, the bearing pin 22 has flat faces 38, 40 on both sides of its face ends, and these flat faces prevent torsion of the bearing pin 22.

During production or upon insertion of the coil, a spacer 42 is also disposed between the ends of the bearing pin 22 and the stator winding 18; it assures the minimal air distance between the field iron and the coil.

Figure 5:
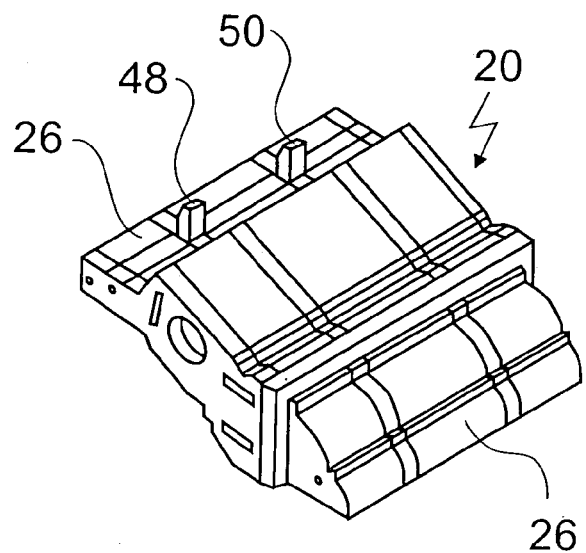
FIG. 5, a perspective view of a brake element of the braking device of FIG. 1.

FIG. 5 also shows the brake element 20 of the braking device of FIG. 1; two guide spurs 48, 50 are mounted on the brake arm 26 here; they protrude into the compression spring 28 and a further compression spring mounted next to it, respectively, and thereby stabilize them.

Figure 6:
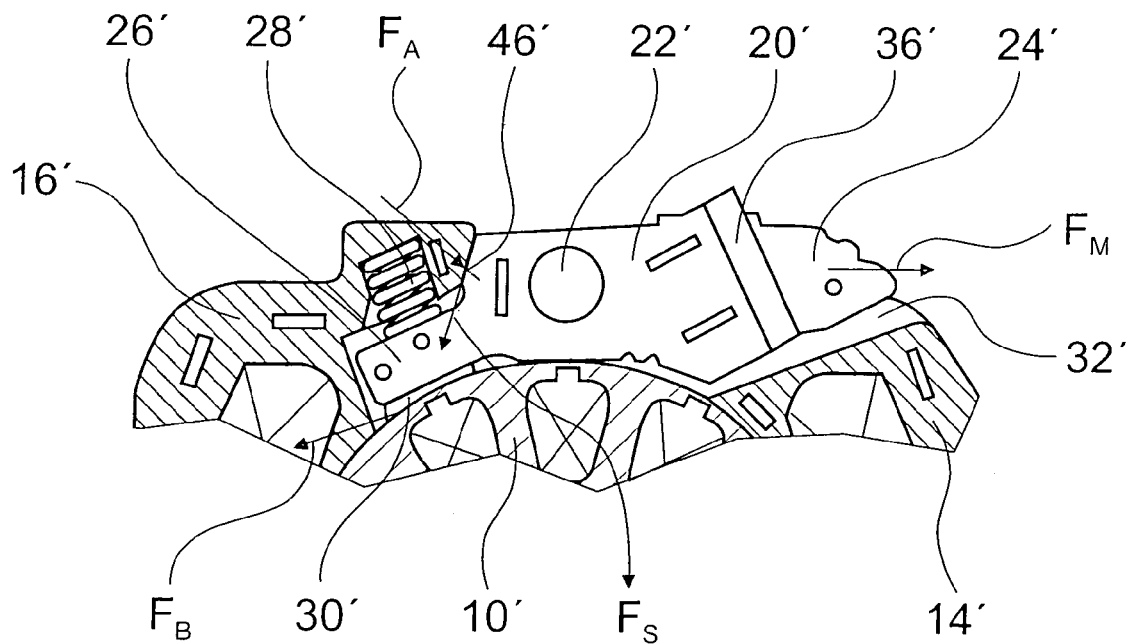
FIG. 6, a schematic sectional view of an alternative exemplary embodiment of a braking device of the invention.

FIG. 6, finally, shows an alternative exemplary embodiment of a braking device of the invention, which largely matches the exemplary embodiment described above, so that to avoid repetition, reference is made hereinafter to the above description, and for corresponding components the same reference numerals are used, with a prime to distinguish them.

A special feature of this braking device is that the yoke part 16' on the trailing end has a stop face 46', on which the brake element 20' rests on the trailing end. This stop face 46' is embodied as a radius, whose origin is located at the pivot point of the brake element. The reaction force FA is always operative through the pivot point and thus generates no servo force.

In braking operation, accordingly, because of the braking force $F_B$ acting on the brake shoe 30', a contact pressure $F_A$ as well as a plane-parallel servo force $F_S$, which presses the brake arm 26' and the brake shoe 30' against the rotor 10', arise at the stop face 46'.

Also shown in FIG. 5 is a magnetic force $F_M$, which when current is supplied to the stator winding acts on the disengagement arm 24' of the brake element 20' and rotates it clockwise out of the braking position shown in FIG. 5 into the operating position.

The invention is not limited to the preferred exemplary embodiments described above. Instead, many variants and modifications are possible that likewise make use of the concept of the invention and are therefore covered by its patent scope.

LIST OF REFERENCE NUMERALS 10, 10' Rotor
12 Rotor winding
14, 14' Yoke part
16, 16' Yoke part
18 Stator winding
20, 20' Brake element
22, 22' Bearing pin
24, 24' Disengagement arm
26, 26' Brake arm
28, 28' Compression spring
30, 30' Brake shoe
32, 32' Air gap
34 Constriction
36, 36' Short-circuit ring
38 Flat face
40 Flat face
42 Spacer
46, 46' Stop face
48 Guide spur
50 Guide spur
TP1–TP8 Lamination packet

The invention claimed is:

1. A braking device for an electric motor, comprising:
a rotor (10, 10') and a stator for a direct current series wound motor;
a brake element (20, 20') which is movable between a braking position and an operating position, wherein a brake shoe (30, 30') which brakes the rotor (10, 10') in the braking position is mounted on the brake element (20, 20'), wherein the brake shoe (30, 30') is mounted on the brake element (20, 20') on a trailing end relative to the direction of rotation of the rotor (10, 10'), wherein the brake element (20, 20'), in the braking position, rests on the trailing end on a fixed stop face (46'), wherein the stop face (46') is fixed to a yoke part of a stator of the electric motor, and wherein the stop face (46') has a predetermined angle of inclination relative to a radial direction, in order to attain a self-clamping of the brake element (20, 20'), said self-clamping pressing the brake shoe (30, 30') against the rotor (10, 10').

2. The braking device of claim 1, wherein the brake element (20, 20') has a brake arm (26, 26') on the trailing end that carries the brake shoe (30, 30'), and has a disengagement arm (24, 24') on a leading end.

3. The braking device of claim 1, wherein the stator has a yoke part (14, 14') of a magnetically conductive material on a leading end and has a stator winding (18).

4. The braking device of claim 3, wherein the brake element (20, 20') is magnetically conductive and, together with the yoke part (14, 14') on the leading end, encloses a motor air gap with the rotor (10, 10') that in the braking position, on the leading end, has an essentially constant gap width.

5. The braking device of claim 3, wherein between the yoke part (14, 14') on the leading end and the disengagement arm of the brake element (20, 20'), there is an air gap (32, 32'), and in the yoke part (14, 14') on the leading end, between the stator winding (18) and the air gap (32, 32') from the disengagement arm (24, 24') of the brake element (20, 20'), there is a constriction (34), which forms a magnetic resistor in the yoke part (14, 14') on the leading end.

6. The braking device of claim 1, wherein the brake element (20, 20') and/or the yoke part (14, 14') on the leading end and/or another yoke part (16, 16') on the trailing end has a plurality of lamination packets (TP1–TP8), which each comprise a plurality of electrical laminations and which are disposed axially successively relative to a pivot axis.

7. The braking device of claim 1, wherein bearing pin (22, 22') for supporting the brake element (20, 20'), the bearing pin (22, 22') being supported in a fixed bearing point by a positive-engagement connection that is secure against relative rotation.

8. The braking device of claim 1, wherein the brake element (20, 20') is prestressed in the direction of the braking position by a compression spring (28, 28'), and a guide spur (48, 50) for the compression spring (28, 28') that protrudes into the compression spring (28, 28') is disposed on the brake element (20, 20').

9. An electric motor having a braking device of claim 1.

10. A machine tool having an electric motor of claim 9.

* * * * *